Nov. 26, 1957 T. M. A. LIPS ET AL 2,814,771

SHAFT-POSITIONING DEVICE

Filed July 8, 1954 5 Sheets-Sheet 1

INVENTORS
T.M.A. LIPS
W.L.VERVEST
BY
[signature]
AGENT

SHAFT-POSITIONING DEVICE

Filed July 8, 1954 5 Sheets-Sheet 2

INVENTORS
T.M.A. LIPS
W.L. VERVEST
BY Fred M. Vogel
AGENT

INVENTORS
T. M. A. LIPS
W. L. VERVEST
BY
Fred M. Vogel
AGENT

INVENTORS
T. M. A. LIPS
W. L. VERVEST
BY
Fred M. Vogel
AGENT

INVENTORS
T.M.A. LIPS
W.L. VERVEST
BY
[signature]
AGENT

United States Patent Office 2,814,771
Patented Nov. 26, 1957

2,814,771

SHAFT-POSITIONING DEVICE

Theodoor Maria Albert Lips and Wilhelmus Lambertus Vervest, Hilversum, Netherlands, assignors, by mesne assignments, to North American Philips Company, Inc., New York, N. Y., a corporation of Delaware Application July 8, 1954, Serial No. 442,094

Claims priority, application Netherlands July 14, 1953

9 Claims. (Cl. 318—469)

Several types of mechanisms are known, in which a shaft rotatable maximally through 360° is adapted to be coupled with a member to be adjusted is brought into any one of a plurality of predetermined angular relations. Such shaft-positioning devices are being used in wireless communication for remote control of tuning means and other members whereof the position is required to be changed on passing over to different frequencies. However, such mechanisms may also be employed in all kinds of instruments and machines, for example machine tools, whereof one member, say a distributor plate, is to be adjusted in a number of predetermined positions.

The present invention concerns shaft-positioning devices in which a part associated through a screw coupling with the shaft to be positioned maximally through 360° is moved in an axial direction upon rotation of the shaft whilst coacting selectively with any one of a plurality of axially adjustable screws in order to arrest the shaft in an angular position determined by the setting of the adjusting screw concerned.

In a known shaft-positioning device of the aforesaid type intended for the adjustment of tuning capacitors of radio receivers, the axially extending adjusting screws are screwed into the wall of a rotatable sleeve and brought successively in front of an axially movable pin by rotating the sleeve. Said pin is secured to an axially guided plate encircling the shaft to be adjusted and comprising two diametrically projecting parts which engage into helical slots provided in the wall of a cylinder secured to the shaft to be adjusted. This known mechanism has a limitation in that backlash of the bearing of the rotatable sleeve comprising the adjusting screws often impairs the accuracy of the angular relation assumed by the shaft to be adjusted upon its rotation being interrupted when the axial pin engages an adjusting screw.

The present invention has for its object to provide a mechanism of the type referred to in the second paragraph, by which the aforesaid limitation is mitigated and which is eminently suitable for electric remote control.

According to the invention the adjusting screws are screwed into holes provided in the wall of a stationary hollow cylinder arranged co-axially with the shaft to be adjusted and whereof the wall for each hole receiving an adjusting screw, is furnished with a longitudinal guide way facing the shaft, the latter comprising an axially travelling nut which is movable within the cylinder and comprises a radially projecting, plate-shaped arm adapted to be moved through a selected one of the guide ways to and from the adjusting screw therein, and the choice of the guide way being determined by a selector member which is rotatable about the shaft to be adjusted and, in an extreme position of the travelling nut when the arm stands clear from the stationary cylinder, can be brought by the travelling nut into any one of a plurality of arresting positions upon rotation of the shaft to be adjusted, in each of which arresting positions the arm is situated in front of a guide way of the stationary cylinder.

Since in the mechanism according to the invention, the adjusting screws form part of a stationary member and co-operation of the arm of the travelling nut with a given adjusting screw is initiated by moving the arm of the travelling nut, due to rotation of the shaft to be adjusted itself, in front of the guide way associated with said given adjusting screw, a simple construction of the mechanism and a high degree of accuracy of the shaft positioning, determined by engagement of the arm with the adjusting screw, are obtained.

A high degree of accuracy of adjustment is obtained by causing the arm of the travelling nut to rest at the same or substantially the same pressure against the adjusting screw concerned, thus constantly removing in the same manner any backlash, for example backlash of the screw coupling between the travelling nut and the shaft to be positioned. To this end the means connecting the driving means to the shaft to be positioned preferably comprise a coupling with a pre-stressed spring, the driving being interrupted upon the driving force exceeding the initial stress of the spring.

Another measure for increasing the accuracy of adjustment consists in that, in a further embodiment of the invention, the arm is bevelled at its lower side where it engages the head of the adjusting screws, in such a manner that the plane, in which said bottom extends, subtends an acute angle with that lateral surface of the arm which, considered in connection with the sense of rotation of the arm, is the rear lateral surface, the adjusting screws being rounded at the face on which the arm is adapted to rest during operation.

For a good understanding of the advantages resulting from this construction of the arm, notice is directed to the fact that the travelling nut and the shaft jointly and constantly rotate in the same sense during operation of the shaft-positioning mechanism. If, for example, the shaft constantly rotates in a clockwise direction the travelling nut, at least, when the arm stands clear from the slots, also rotates constantly, in a clockwise direction, and, if the arm is in any of the slots, unavoidable clearance between the travelling nut and the shaft is completely removed for any counter-clockwise movement of the nut and its associated arm. Thus it is ensured that the arm, when engaging the head of the adjusting screw, is caused to move as far as possible, depending upon the width of the slot, in a counter-clockwise direction with the shaft rotating in a clockwise direction. In any position of the arm the clearance between nut and shaft is invariably removed in the same direction, which is beneficial to the accuracy of the various positions occupied by the shaft.

The coupling with pre-stressed spring is obtained in a simple manner by incorporating in the driving means for the shaft to be positioned a self-braking worm gear whereof the worm is movable in its direction of length against the force of a pre-stressed spring. If the shaft is driven by an electric motor the worm is capable of operating an electrical contact device by means of which the supply current for the motor is interrupted.

In an advantageous form of the shaft positioning device according to the invention, the hollow cylinder, into which the adjusting screws are screwed, is made up of a plurality of stacked, thin metal rings which are connected together and previously provided with a number of holes and radial recesses. The cylinder thus formed is cheap in manufacture since the rings may be punched out of sheet material.

In a further embodiment of the invention the slots provided in the hollow cylinder have the form of a trapezium whereof the shorter of the two parallel sides is located at the inner side of the cylinder, which side has a length approximately corresponding to the thickness of the arm.

The trapezium is preferably equilateral. This form of the guide ways has the advantage that the place of the arm in the sense of rotation is determined more accurately.

In a still further embodiment of the invention the trapezium is equilateral and the perpendiculars dropped from the intersection of the two bisectors of the base angles on the longer of the parallel sides and on the two standing sides are all located within the trapezium, the two standing sides and the base being partly provided with a screwthread whereof the core diameter substantially corresponds to twice the length of each perpendicular. By this form of the trapezium the provision of screwthread for the stop screws is simplified, since in this case it is no longer necessary to drill the holes to be threaded. the two standing sides and the base constituting the core of the screwthread to be provided.

In one form of the invention, a method of making the aforesaid cylinder consists in providing a metal rod, whose width corresponds to the length of the desired active part of the cylinder, with equally spaced slots of rectangular cross-sectional area, which slots extend at right angles to the longitudinal direction of the rod, a portion of the rod or the whole rod being deformed into a round cyclinder and the slots being provided at its inner side, while the width of the slots in proportion to the diameter of the cylinder to be formed is chosen to tbe such that, after deformation, the smaller of the two parallel sides of the equilateral trapezium thus obtained, is equal to or slightly exceeds the thickness of the arm movable in the slots during operation.

The adjustable screws are required to be held in corresponding holes so that, on the one hand, the arm of the travelling nut cannot change the adjustment of the screws and, on the other hand, their adjustment is variable externally without considerable effort. In the shaft positioning device according to the invention this is preferably achieved by providing that end of the adjusting screws, which does not co-act with the arm, with a slot which may also accommodate a screw driver for adjusting said screws. The adjusting screws may alternatively be held by providing each of them with two or more angularly related radial holes at different heights, in which holes nylon pins are inserted which are cut off beyond the adjusting screws, the ends of the nylon pins maintaining the adjusting screws in the threaded hole.

In order that the invention may be readily carried into effect it will now be described with reference to the accompanying drawings, in which one embodiment of the invention is represented by way of example, and in which Fig. 1 is a longitudinal section of said embodiment, Fig. 2 is a cross-section on the line II—II of Fig. 1, Fig. 3 is a fragmentary side view, viewed from the left of Fig. 1, Fig. 4 is a cross-section on the line IV—IV of Fig. 1.

Fig. 5 shows a detail of a section on the line V—V of Fig. 1,

Fig. 6*a* shows a detail of the cross-section on the line VI—VI of Fig. 1,

Fig. 6*b* is a fragmentary side view, viewed from the right of Fig. 1 on the line VI—VI.

Figure 1:
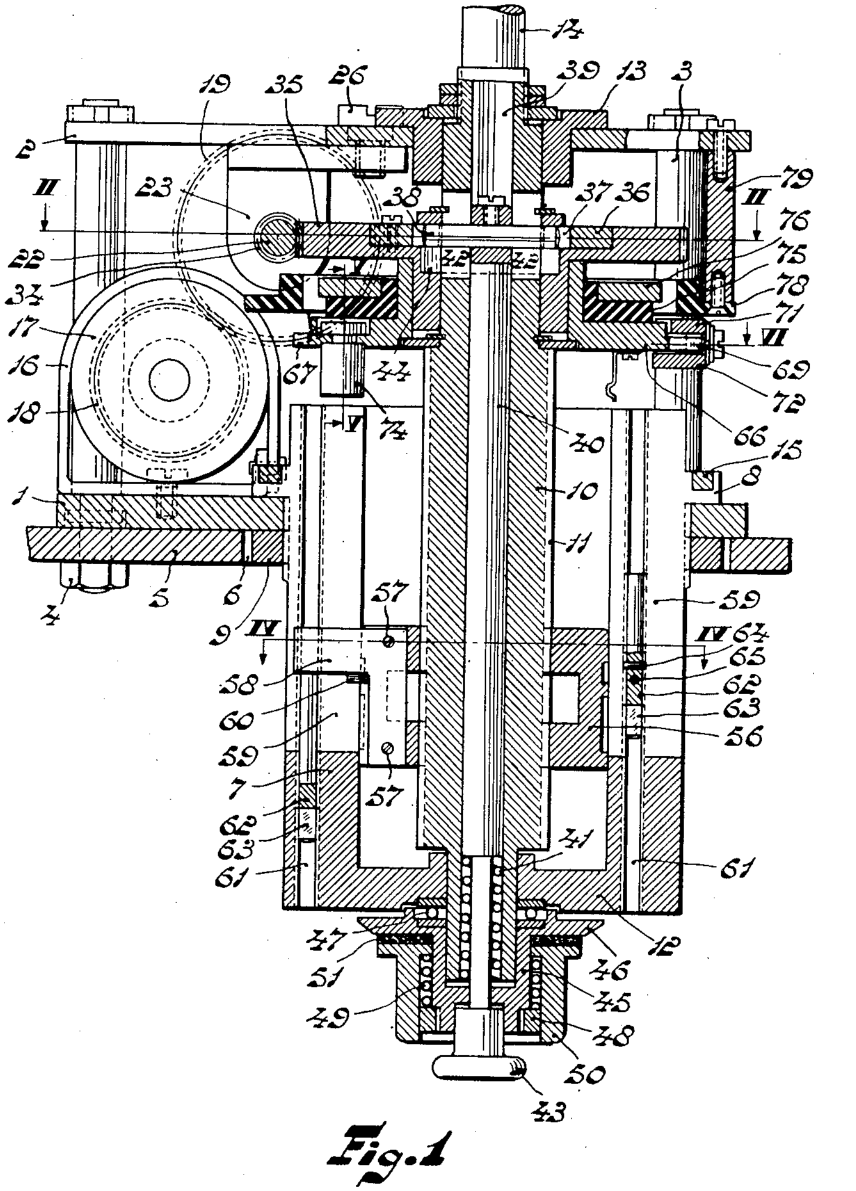

The embodiment shown in the drawings comprises two parallel frame plates 1 and 2 interconnected by means of four cross bars 3. By means of nuts 4 screwed onto the cross bars the assemblage is mounted on a chassis plate 5. By means of a ring nut 9 a hollow cylinder 7 is fixedly mounted in the plate 1, said cylinder passing through an aperture 6 of the plate 5 and being clamped with a rim 8 onto the plate 1. A hollow shaft 10 comprising, within the cylinder, a multiplex (tenfold) thread 11 having a large pitch is rotatably mounted coaxially with the cylinder 7. This shaft is supported at one end in the bottom 12 of the cylinder 7 and at its other end in a sleeve 13 resting on the frame plate 2. The shaft 10 is the shaft to be positioned of the device and adapted to be coupled with its end 14 to a member which by means of the mechanism is adjustable in any one of a plurality of predetermined positions. For example the end 14 may be coupled with the shaft of a capacitor maximally movable through 360°.

By means of braces 16 an electric motor 17 is mounted on the frame plate 1, the shaft of this motor having secured to it a gear wheel 18 meshed with a gear wheel 19. The latter has a hole 20 with two key ways 21 situated diametrically in front of each other. The gear wheel 19 is secured to one end of a worm shaft 22 which is journalled in supports 23 and 24 secured by means of screws 26, one of which is shown in Fig. 1 to the inner wall of the frame plate 2. By means of a pin 27 a ring 28 with two ribs 29 running in the key way 21 is secured to that end of the worm shaft which carries the gear wheel 19. A pre-stressed compression spring 31 is locked between the ring 28 and a collar 30 of the gear wheel 19. With the interposition of a ball bearing 32 the hub of the gear wheel 19 rests against the side of the support 23. The other end of the worm shaft 22 comprises a ball bearing 33 resting against the support 24.

The worm shaft 22 has a worm 34 meshed with a worm gear 35 which is rotatably mounted on the shaft 10. A ring 36 with a central hole slightly exceeding the diameter of the shaft 10 is secured in a circular recess of the worm gear 35. Said ring has two radial recesses 37 normally engaged by the ends of a pin 38 which is secured in a bar 40. This bar engages the central hole 39 of the shaft 10 and is axially movable relatively to the shaft 10 against the pressure of a spring 41. The pin 38 traverses longitudinal slots 42 of the shaft 10 and normally transmits the motion of the gear wheel 35 to the shaft 10. This connection is interrupted upon axial displacement of the bar 40 by pulling the bar by means of the knob 43, the ends of the pin 38 then leaving the slots 37 of the ring 36 and entering the annular recess 44 of the worm gear 35.

Screwed to and locked in position at that end of the shaft 10, which is supported in the bottom of the cylinder 7, is a part 45 with a flange 46 which may be furnished with a scale division. A ball bearing 47 is provided between the bottom side of the flange and the bottom 12 of the cylinder 7. The part 45 has screwed to it a ring 48 locking a spring 49 within a hand-control knob 43. Through a felt ring 51, constituting a friction coupling subjected to the pressure of the spring 49, said knob is coupled to the flange 46.

Over the multiplex thread 11 of the shaft 10 passes a travelling nut 56 to which a radially projecting plate-shaped arm 58 is secured by means of screws 57. Said arm 58 is adapted to be guided in an axial direction in any one of a plurality of radially extending longitudinal saw cuts 59 of the cylinder 7. The arm 58 comprises at its bottom side a knife-shaped portion 60 which, when selecting a guide way 59 urges the arm into this selected guide way.

Figure 4:
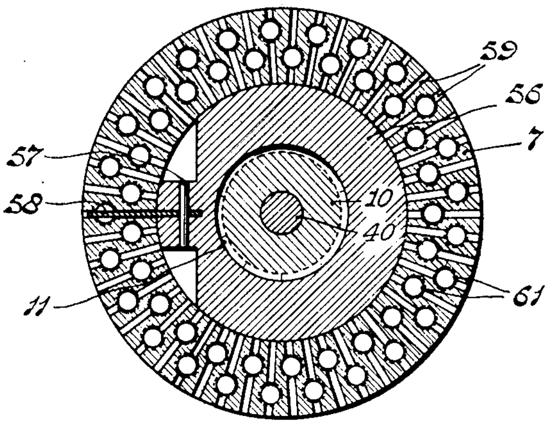

The wall of the cylinder 7 is furnished with a plurality, say fifty, of axial holes 61 into which adjusting screws 62 are screwed. The lower side of the arm 58 is bevelled (Figs. 7 and 8) and the head of the screw 62 is rounded. The guide ways 59 each comprise one of the holes 61 which are arranged on two circles extending concentrically with the shaft (Fig. 4). With a given circumference of the cylinder 7 the arrangement of the holes on more than one circle permits a large number of holes to be provided without jeopardizing the stability and robustness of the cylinder. The stability of the open end of the cylinder 7 is enhanced by a ring 15 engaging a slot of the rim 8.

Situated in front of the open end of the cylinder 7 is a selector member 66 which is rotatably mounted on the hub of the worm 35 and furnished with peripheral saw teeth 67 meshed with a pivoted pawl 69 (Figures *6a* and *6b*) which is subjected to the force of a plate spring 68 and arrests the selector in a number of evenly spaced angular positions. The pawl 69 is secured to a holder 70 supported in two parallel strips 71 and 72 secured to two of the cross bars 3. Viewed from above in Fig. 1, the pawl 69 allows the selector 66 to rotate in a clockwise direction but not in the opposite direction.

Figures 5, 6A, 6B:
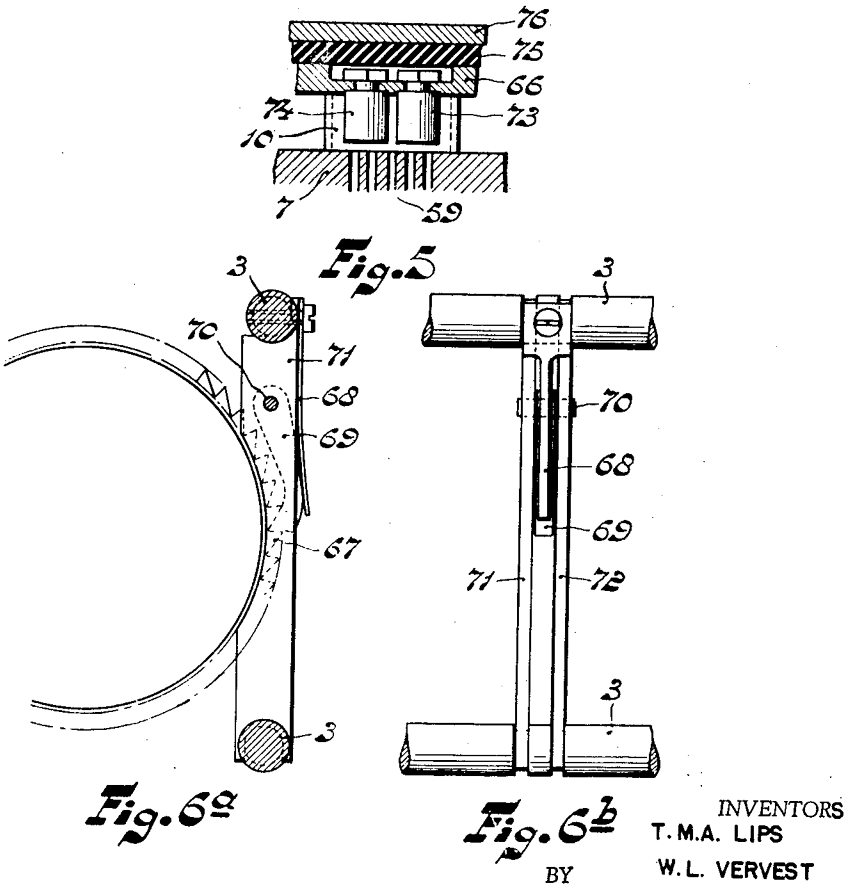

Two pins 73 and 74 slightly overtopping the cylinder wall (Figures 1 and 5) and slightly spaced apart from each other are secured to the selector 66 opposite the wall of the cylinder 7. Said pins guide the arm 58 of the travelling nut 56 passing over the thread 11 when the arm stands clear from the cylinder 7. In each of the arresting positions of the selector 66, determined by the teeth 67, the space between the pins 73 and 74 is opposite one of the guide ways 59.

Figure 2:
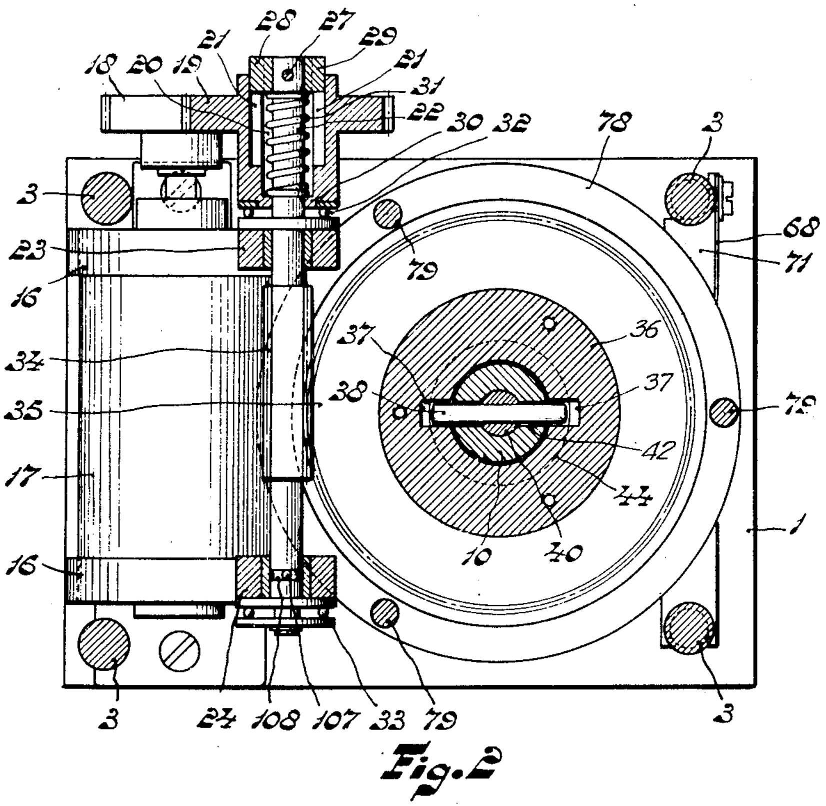

A collector 76 whereof the edge co-operates with ten sliding contacts 77 is secured, in a manner not shown, to the selector 66 with the interposition of an insulating spacer 75. Said sliding contacts 77 are secured in an insulating annular contact support 78 and evenly distributed at the periphery. The collector 76 and the contact support 78 are only roughly indicated in Figures 1 and 2 but more completely shown in Fig. 7. By means of three columns 79 the contact support 78 is connected to the frame plate 2. The collector 76 comprises at its periphery alternating insulating and conducting segments 80 and 81 respectively. The insulating segments 80 are non-conducting inserts fitted in recesses of the edge of the otherwise conducting collector 76. The insulating segments 80 are so arranged that in the fifty arresting positions of the selector 66, determined by the pawl 69 coacting with the teeth 67, a different combination of five of the sliding contacts 77 each time contacts electrically with the conducting part of the collector 76, whilst the remaining five sliding contacts rest on an insulating segment. A sliding contact 82 which, similarly to the sliding contacts 77, is carried by the contact support 78, constantly engages the conducting part of the collector 76.

Figures 7, 8, 12:
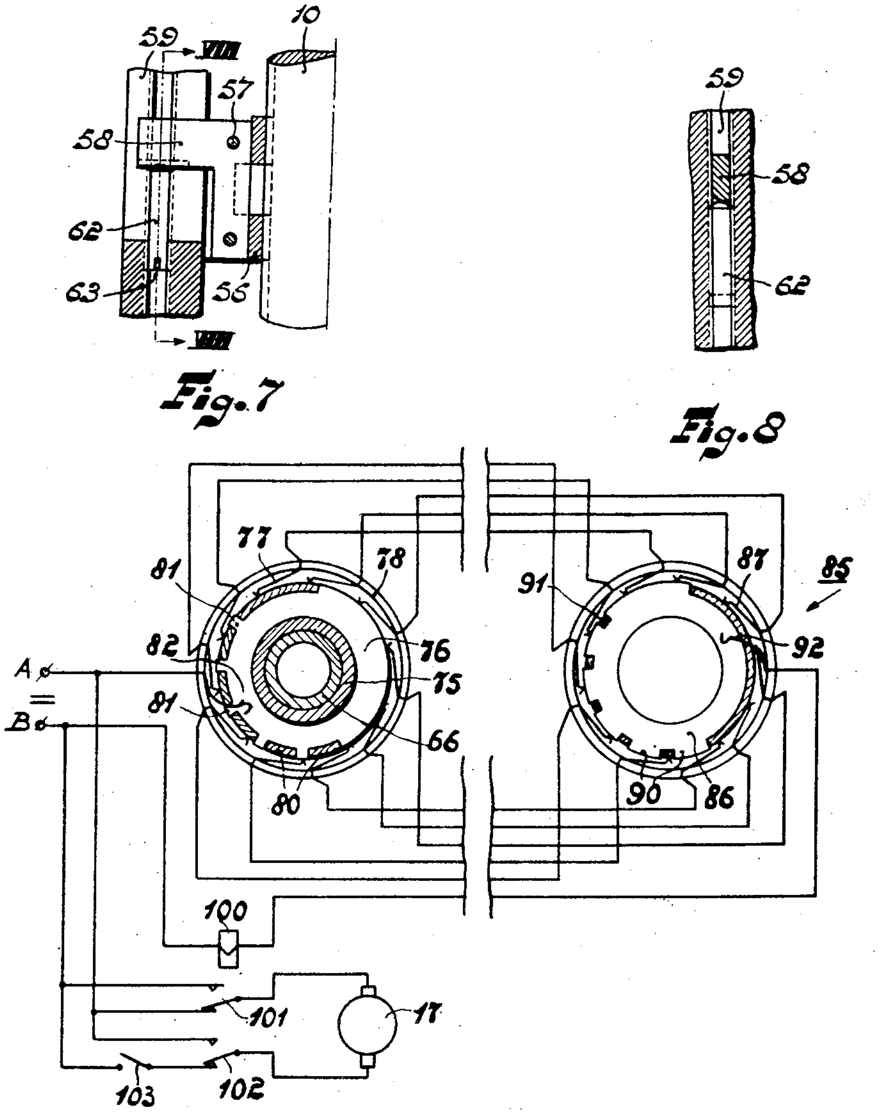
Fig. 7 shows a part of the shaft-positioning device depicted in Fig. 1, in which the arm is bevelled.
Fig. 8 is a sectional view on the line VIII—VIII of Fig. 7.
Fig. 12 is the electrical wiring diagram of said embodiment.

From Fig. 12 it is seen that each of the sliding contacts 77 is electrically connected to a corresponding stationary sliding contact 87 of a control switch denoted as a whole by 85 and arbitrarily spaced from the mechanism shown in Fig. 1. The control switch 85 comprises a rotary manually adjustable collector 86 which, similarly to the collector 76 of the mechanism shown in Fig. 1, comprises peripheral alternately conducting and insulating sectors 90 and 91 respectively. However, the collector discs 76 and 86 are complementary, that is to say that each conducting sector 81 of the disc 76 corresponds to a similar, but insulating sector 91 of the disc 86. The collector disc 86 is manually adjustable in any of fifty arresting positions evenly distributed over 360°. These arresting positions which correspond to the arresting positions of the selector 66 are so chosen that only when the arresting position assumed by the selector member 66 together with the collector 76 corresponds to the arresting position assumed by the collector disc 86 of the control switch 85, no electric connection through the sliding contacts 77 and 87 and the conductors connecting them is established between the sliding contact 82, which co-acts with the conducting part of the collector 76, and a similar sliding contact 92 co-acting with the conducting part of the collector 86 of the control switch 85.

Figure 3:
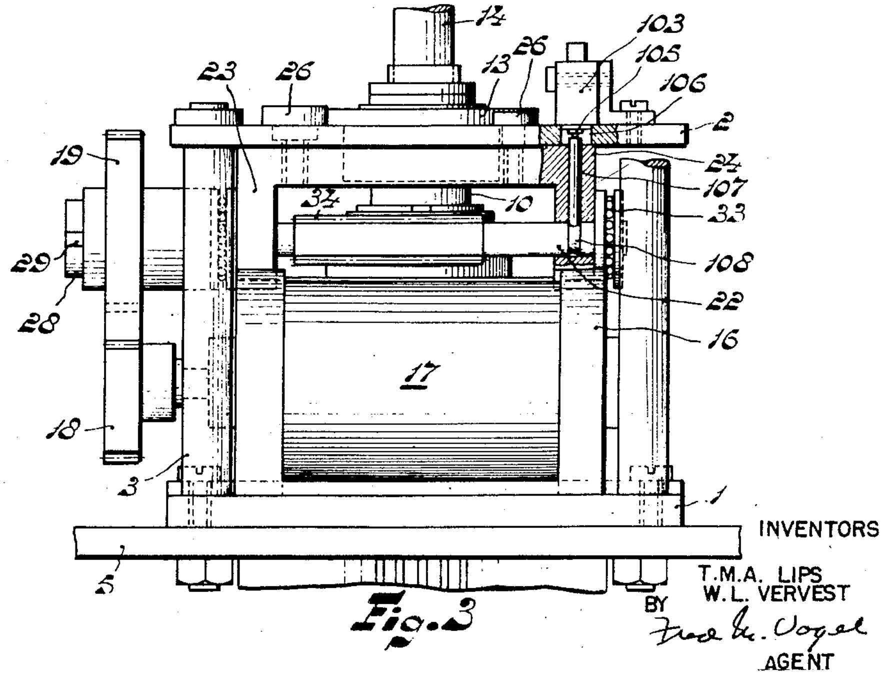

The sliding contacts 82 and 92 form part of an electrical circuit which comprises a relay 100 and is connected to the terminals A and B of a source of direct voltage. To these terminals is also connected a circuit for the motor 17, which circuit comprises two change-over contacts 101 and 102 of the relay 100. The change-over contacts are connected so that on operating both contacts by energising the relay 100, the armature current of the motor 17, whereof the field is produced by permanent magnets, is inversed with the result that the sense of rotation of the motor is also inversed. As shown in Fig. 7, a switch 103 is connected in series with relay contacts that are closed in the de-energised condition of the relay 100. Said switch 103, which is of the type "Micro-switch" is mounted on top of the frame plate 2, as may be seen from Fig. 3. A pin 107, whereof the rounded end coacts with the periphery of the worm shaft 22 situated in the support 24, co-acts with a push-button 105 of the switch 103, which push-button engages into an opening 106 of the frame plate 2. In the normal position of the worm shaft 22, that is to say when the latter has been urged into its extreme upper position by the compression spring 31 (Fig. 2), the end of the pin 107 rests in a circular slot 108 of the worm shaft 22. In this position the switch 103 is closed. If the load of the worm wheel 35 exceeds the initial stress of the spring 31, the worm 34 is moved in its direction of length by the motor 17 against the action of the spring 31, with the result that the pin 107 is urged out of the slot 108. This results in opening the switch 103 and, if the relay 100 is de-energised, in interrupting the supply current for the motor 17. The admitted longitudinal displacement of the worm shaft 22 is sufficient for the motor to run out.

The operation of the mechanism is as follows: Let it be assumed that the mechanism is in the rest condition in which, as is seen from Fig. 1, the arm 58 of the travelling nut 56 is maintained against one of the adjusting screws 62. In this case the shaft 10 assumes an angular position determined by the setting of the adjusting screw 62 concerned. The pressure at which the arm 58 engages the adjusting screw 62 is produced by the spring 31 against the action of which the worm shaft 22 with the worm 34 has been moved by the motor 17. As a result of this displacement the switch 103 is open. The selector 66 then assumes an arresting position in which the space between the pins 73 and 74 is situated above the guide way 59 then engaged by the arm 58.

The collector 76 and the collector disc 86 of the control switch 85 occupy a corresponding position so that the sliding contacts 82 and 92 are not interconnected and the relay 100 is no longer provided with current. Since the switch 103 is open the motor 17 is likewise de-energised.

If the shaft 10 and consequently also the member coupled to its end 14 are to be brought into a different angular position determined by another of the adjusting screws 62 the collector disc 86 of the control switch 85 is turned into an arresting position so that, if the selector 66 were to assume the corresponding position, the space between the pins 73 and 74 would be located above that guide way into which the adjusting screw has been screwed, which is required to be engaged by the arm 58. Due to said rotation of the collector disc 86 an electrical connection is constantly established, at one of the conductors connecting the sliding contacts 77 to the contacts 87, between the sliding contacts 82 and 92 so that the relay 100 is energised. As a result the change-over contacts 101 and 102 are operated and the electric motor 17 is energised such that the motor causes the worm wheel 35 to rotate in a clock-wise manner, viewed from above in Fig. 1. During this rotation the worm 34 first screws back by the action of the spring 31 so that the worm shaft 32 assumes the position shown in Fig. 2, in which the switch 103 is closed.

As a result of the rotation in a clockwise manner of the worm wheel 35, when the shaft 10 is taken along, the travelling nut 56 passes over the thread 11 in an axial direction towards the selector 66. Upon the arm 58 ultimately leaving the slot 59 in which the arm is guided, the latter finds its way between the pins 73 and 74. Upon the upper side of the nut 56 engaging the lower side of the selector, the latter as well as the collector 76 is taken along. This displacement of the selector is not prevented by the pawl 69. When the collector 76 assumes the position corresponding to that assumed by the collector disc 86 of the control switch 85 the sliding contacts 82 and 92 are electrically disconnected with the result that the relay 100 is de-energised and the change-over contacts 101 and 102 assume their initial rest condition. The armature current of the motor 17 is consequently inversed so that the motor tends to operate in the opposite direction and the worm wheel 35 starts rotating in an anti clock-wise direction, viewed from above in Fig. 1. For this sense of rotation the selector 66 is arrested by the pawl 69 so that the selector is maintained in the position in which the space between the pins 73 and 74 is above the guide way into which the adjusting screw has been screwed, which determines the new angular position to be assumed by the shaft 10. While the selector 66 is being held by the pawl 69, the shaft 10 rotates in an anti-clockwise direction, the right-handed thread 11 then displacing the travelling nut 56 over the shaft 10 in the direction of the bottom 12. In this case the travelling nut is initially axially guided by the pin 73 and subsequently by the wall of the guide way below the space between the pins 73 and 74. The short, knife-shaped part 60 of the arm 58 provides that the arm constantially engages the guide way. Upon the lower side of the arm engaging the end of the newly selected adjusting screw, any further rotation of the shaft 10 is prevented so that the worm 34 with the worm shaft 22 tends to move in a longitudinal direction against the action of the spring 31, the pin 107 then being urged out of the slot 108 and the switch 103 being opened. This results in that the armature current of the motor 17 is interrupted, the admitted longitudinal displacement of the worm shaft 82 being sufficient for the motor 17 to run out. In this case the mechanism is again in a rest condition, wherein the shaft 10 assumes an angular relation which is entirely determined by the setting of the adjusting screw then co-acting with the arm 58 of the travelling nut. The compressed spring 31 causes the arm 58 to engage the top of the adjusting screw with some pressure, thus entirely preventing any backlash between the travelling nut and the thread 11.

If the shaft 10 invariably rotates in a clockwise direction, the nut 56, provided the arm 58 associated therewith stands clear from the slot, also has the sense of rotation during operation and this means that there is practically no clearance between the screw thread 11 and the travelling nut 56 for counter-clockwise movement of said nut. The bevelled portion at the bottom side of the arm 58 subtends an acute angle with the right-hand face of the arm 58, which face, if the nut is carried along by the shaft, constitutes the rear surface of the arm. If the arm 58 engages the screw 62, the arm, as is shown in Fig. 8, will invariably be urged to the right, i. e. in the direction in which the clearance between the shaft 10 and the nut 56 has already been removed as much as possible. Moreover, the direction in which the clearance is removed is invariably the same for all the slots, hence for all the positions of the arm 58. It will be appreciated that the accuracy with which the various positions of the shaft 10 are determined is enhanced by this step. If desired, the arm 58 and the adjusting screws 62 may be made from hard or hardened material, thus avoiding wear even after operation for a long time.

The angular position of the shaft 10 determined by co-operation of the arm 58 with an adjusting screw 62 is variable by screwing the adjusting screw concerned deeper or less deep into its hole. This may be effected by means of a screw driver introduced from the bottom side of the cylinder 7 into the hole concerned. At the end facing this side, each adjusting screw has a slot 63 which not only accommodates the end of the screw driver but also provides that the setting of the adjusting screw is maintained by the resilience of the two end parts separated by the slot, without the setting requiring undue effort.

As may be seen at the right of Fig. 1, an adjusting screw may alternatively be held by means of two nylon pins 64 and 65 extending at right angles to each other and each traversing the adjusting screw, these pins being cut off at both sides of the latter. Purposely, a plurality of nylon pins are used lest the adjusting screw be not held in a setting in which a pin enters the guide way instead of engaging the thread.

In order for an adjusting screw to be adjusted unimpeded and the shaft 10 to be adjusted by hand, the coupling between the disc 36 and the pin 38 is disengaged by pulling the knob 43. By means of the knob 50 the shaft 10 can then be rotated arbitrarily. If in this case said shaft is arrested as a result of cooperation of the arm 58 with an adjusting screw, the friction coupling between the knob 50 and the flange 46 prevents the torque transmitted to the shaft from attaining an undue value.

In this embodiment the hollow cylinder 7 is made in one piece. However, this cylinder may advantageously be made up of a number of stacked rings, each, say, ½ mm. thick and having recesses corresponding to the holes 61 and the guide ways 59. The rings may be stamped from sheet brass. The radial recesses, jointly forming the guide ways 59 after stacking the rings end at some distance from the outer periphery of the rings.

A further form of the hollow cylinder and a method of making it will be explained with reference to Figures 9, 10 and 11.

Figure 9:
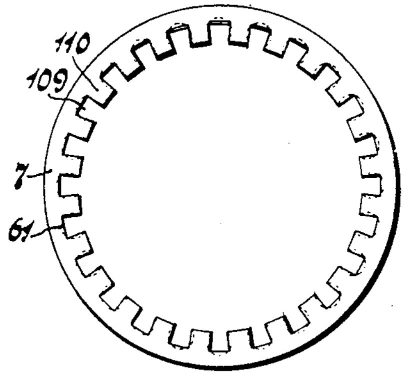
Fig. 9 is a plan view of the hollow cylinder internally provided with slots having a cross-sectional area in the form of a trapezium.

In Fig. 9, the hollow cylinder 7 is, for example, made from brass and internally provided with twenty-four slots 109, the cross-sectional area of each of which has the form of an equilateral trapezium. The two slots are separated by a member 110 having a rectangular cross-sectional area. Each slot is provided with a screwthread 61 partly provided in the two standing walls of the trapezium and partly in the base. As shown in Fig. 10, the form of the trapezium is such that the perpendiculars 111 from the intersection of the bisectors 112 and 113 dropped from the base angles 114 and 115 on the two standing sides and the base are all located within the trapezium, while the core diameter of the screwthread provided in the trapezium corresponds to twice the length of each perpendicular 111, in other words the core diameter corresponds to the inscribed circle. Hence, no hole is to be drilled for providing the screwthread. The length of the smaller parallel side of the trapezium corresponds to or slightly exceeds the thickness of the arm movable in the trapezium-shaped slot. This results in that the place of said arm is not determined by the faces but only by the keen edges 116 and 117 so that the position of the arm is determined more accurately.

Figure 10:
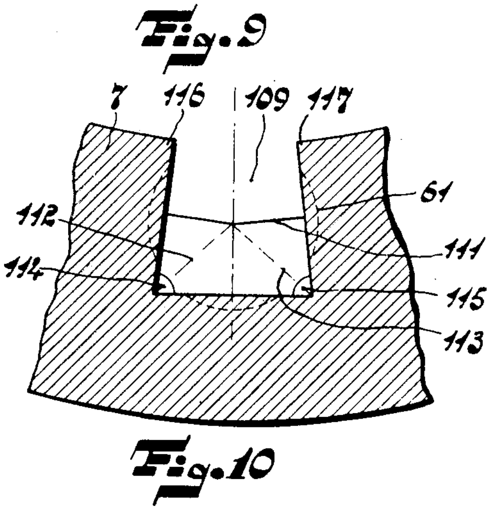
Fig. 10 shows a slot, depicted in Fig. 9, on a larger scale.
Figure 11:
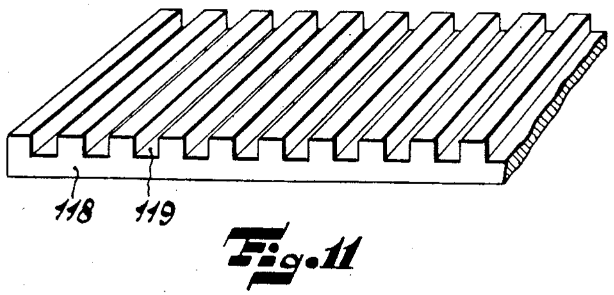
Fig. 11 is a perspective view of a rod furnished with rectangular slots.

The hollow cylinder with slots shown in Figures 9 and 10 can be manufactured by providing, as shown in Fig. 11, a rod 118, for example made from brass, with rectangular slots 119 extending at right angles to the longitudinal direction of the rod and obtained, for example, by milling. Subsequently, a part of the rod 118 of the whole rod is deformed into a round cylinder with internal slots. The dimensions of the slots 119 are so chosen, in connection with the cylinder to be formed, that they exhibit the required trapezium form after deformation. The ends of the rod 118 may be secured together by soldering and the bottom of the cylinder may also be secured by soldering to the cylinder itself.

This method of manufacturing the cylinder is particularly advisable if only a comparatively small number of such cylinders is to be made. In the case of larger numbers the cylinder slots may be provided by means of a broach. Since such a broach is expensive the aforesaid method of manufacture will preferably be used for small numbers. In the case of large numbers the cylinders may be made by extrusion which, of course, permits of extruding long cylinders each comprising several times the desired length. Fundamentally, it is also possible to extrude a cylinder with trapezium-shaped slots and bottom in one piece. Economically, however, this is only justified in the case of large numbers.

What is claimed is:

1. A shaft positioning device comprising a screw coupling, a part operatively connected through said screw coupling to said shaft thereby affording a maximum of 360° rotation thereof, means moving said part in an axial direction upon rotation of said shaft, a stationary hollow cylinder arranged co-axially with the shaft to be adjusted, said hollow cylinder having a plurality of holes, a plurality of axially adjustable screws in said holes, a plurality of guide ways in said cylinder extending in a direction parallel to the longitudinal axis of said hollow cylinder and opening outwardly toward said shaft, a selector member connected to said screw coupling and rotatable about said shaft, an axially movable nut within said cylinder having a radially-projecting, plate-shaped arm adapted to be moved into a selected guide way determined by said selector member when said movable nut is in one extreme position adjacent to one end of said cylinder, said arm co-acting selectively with alternate screws thereby arresting the rotating shaft at a position predetermined by the particular setting of the adjusting screw concerned.

2. A shaft positioning device as set forth in claim 1 further comprising a yieldable coupling through which said shaft to be positioned is driven, said coupling continuing to act on said shaft after adjustment of the latter.

3. A shaft positioning device as set forth in claim 2 further comprising an electric motor for driving said shaft, an electrical contact device, said screw coupling being a self-braking worm gear whereby when said worm is movable in the direction of its length against the action of said yieldable coupling said worm co-acts with said electrical contact device to interrupt the supply current for said motor.

4. A shaft positioning device as set forth in claim 1 wherein each of the axially adjustable screws is slotted at the end remote from the end co-acting with said arm.

5. A shaft positioning device as set forth in claim 1 further comprising at least two spaced, angularly offset nylon cross pins provided in each of the axially adjustable screws.

6. A shaft positioning device as set forth in claim 1 wherein the bottom surface of said arm which engages said axially adjustable screw is bevelled forming an acute angle with the rear surface thereof, said screw being rounded on the end co-acting with said arm.

7. A shaft positioning device as set forth in claim 6 wherein said hollow cylinder is constituted of a plurality of superposed uniform rings of sheet material being provided with holes and radial recesses.

8. A shaft positioning device as set forth in claim 6 wherein said hollow cylinder is provided on its inner periphery with a plurality of guide ways, the cross-sectional area of each guide way being an equilateral trapezium where the shorter of the two parallel sides is located toward the inner side of said cylinder and has a length substantially corresponding to the thickness of said arm.

9. A shaft positioning device as set forth in claim 8 wherein the perpendiculars dropped from the intersection of the two bisectors of the base angles on the longer of the parallel sides and on the two standing sides are all located within said trapezium, the two standing sides and the base being partly provided with a screw thread whereof the core diameter of said combined screw thread is substantially twice the length of each perpendicular.

References Cited in the file of this patent

UNITED STATES PATENTS

| | | |
|---|---|---|
| 2,320,498 | Wheeler | June 1, 1943 |
| 2,378,941 | May | June 26, 1945 |
| 2,496,456 | Elliott | Feb. 7, 1950 |
| 2,557,722 | Brauchler | June 19, 1951 |